United States Patent Office 3,406,213
Patented Oct. 15, 1968

3,406,213
PROCESS FOR STABILIZING HALOGENATED HYDROCARBONS
Germano Patron, Venice, Italy, assignor to Montecatini-Edison S.p.A., Milan, Italy
No Drawing. Filed Mar. 7, 1966, Ser. No. 532,079
Claims priority, application Italy, Mar. 12, 1965, 5,490/65
7 Claims. (Cl. 260—652.5)

ABSTRACT OF THE DISCLOSURE

Liquid halogenated hydrocarbons, e.g. trichloroethylene, a conventional solvent, are stabilized against decomposition by the addition of a furfural dialkylhydrazone of the formula:

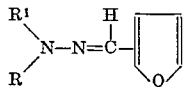

wherein R and $R^1$ are the same or different and represent lower alkyl moieties of from 1 to 3 carbon atoms. The stabilization may be enhanced by also adding an epoxide e.g. butylene oxide and a phenol.

---

The present invention relates to the stabilization of halogenated hydrocarbons against decomposition. More particularly, it relates to the stabilization against decomposition of chlorinated hydrocarbons such as trichloroethylene and tetrachloroethylene, which hydrocarbons are conventionally used as solvents in various industrial processes.

As is already well known, chlorinated hydrocarbons, and particularly trichloroethylene and perchloroethylene, are widely used in many different technical processes, mainly as solvents for fats and other organic substances, for example in the degreasing of metal, in the extraction of oils and fats, in the dry cleaning of textiles, etc.

Owing to the action of heat, oxygen, light and water, these chlorinated hydrocarbons tend to decompose and form acid products such as hydrochloric acid, toxic products such as phosgene, tarry substances and the like. Their decomposition products cause serious problems both during their storage and during their transport, as well as during their use and in the recovery of the said solvents themselves.

Furthermore, this decomposition is accelerated by the presence of metals and metal salts, as well as by the presence of direct and indirect products of the decomposition itself, and it is autocatalytic.

The aforesaid disadvantages are particularly serious in regard to the degreasing of metals, and in particular of metals containing iron or aluminum, where, because of the severe conditions to which the solvent is subjected with the joint and prolonged action of heat, oxygen, humidity and by the action of the metal itself, there is effected a considerable decomposition of solvent. This decomposition is itself accelerated by the chlorides which form pursuant to the action of the hydrochloric acid which is liberated on the metal. Corrosion of the metal pieces undergoing degreasing thence ensues.

It is, therefore, of fundamental industrial importance to prevent the decomposition of chlorinated solvents and/or to neutralize the damaging effects of decomposition products.

It is a known prior art preventative technique therefor to admix suitable stabilizers with the chlorinated solvents.

Many and varied stabilizers have been suggested, particularly antioxidants, i.e. compounds that inhibit the oxidizing action of air or of acid absorbing substances intended to neutralize and thereby hindering the autocatalytic decomposition reactions.

The stabilizing system must, furthermore, be such as to ensure the neutrality of the solvent, even under the most severe conditions (the alkalinity of the solvent, imparted by stabilizers of a strongly basic nature, is just as damaging as the acidity, which makes it wholly unsuitable for the degreasing of amphoteric metals such as aluminum and zinc), and it must likewise develop lasting stabilizing action, both in the liquid phase, as well as in the vapor phase of the degreasing process.

Most of the stabilizing agents heretofore known in the art lack the aforesaid desirable characteristics, and thus are wholly inadequate, insofar as ensuring effective and permanent stabilization of chlorinated solvents is concerned.

According to this invention certain derivatives of furfural, and, more particularly, the dialkylhydrazones of furfural (or furfuraldialkylhydrazones) have been found to be particularly effective for stabilizing halogenated hydrocarbons, such as trichloroethylene and perchloroethylene, and even under the most severe conditions.

The dialkylhydrazones of furfural effective for stabilizing the halogenated hydrocarbons according to this invention are obtained by condensing equimolecular amounts of furfural (or furfural aldehyde) with an asymmetric dialkylhydrazine (or N,N-dialkylhydrazine).

More particularly, best results are obtained by using furfural dialkylhydrazones wherein the alkyl groups have from 1 to 3 carbon atoms, such as, for example, dimethylfurfuralhydrazone, diethylfurfuralhydrazone, methylethyl-furfuralhydrazone, methylpropylfurfuralhydrazone and the like.

According to the present invention, the amount of furfural-dialkylhydrazone to be added to the halogenated hydrocarbon obviously depends on the type of solvent to be stabilized, on the use foreseen for the solvent, on the degree of stabilization required and on the possible presence of other additives.

Very small quantities of stabilizer are generally sufficient for effective results and, in practice, concentrations varying from 0.001 to 0.1% by weight with respect to the solvent to be stabilized, and preferably from 0.005 to 0.05%, are used.

Greater quantities may be used, but are not absolutely necessary.

Furthermore, it has also been found that a halogenated hydrocarbon stabilizing action of exceptional effectiveness can be attributed to the combination of a furfural dialkylhydrazone; an epoxide such as butylene oxide, propylene oxide, glycidol and amylene oxide; and a phenol such as thymol, phenol, nitrophenol, eugenol, isopropyl-p-hydroxyanisole, p-tertiary-amylphenol and hydroquinone monoethylether.

The particular combination of the above mentioned compounds is quite effective for stabilizing trichloroethylene and perchloroethylene, against decomposition, and which solvents may thus be used for a wider variety of uses and under more severe conditions without the risk of formation of harmful decomposition products. Moreover trichloroethylene and perchloroethylene stabilized according to this invention do not display any appreciable tendency to decompose, either during storage or during use under the most severe conditions, such as the degreasing of metals and in recovery operations by distillation of the solvent.

A stabilizing system particularly suitable for trichloroethylene and perchloroethylene is a mixture of dimethylfurfuralhydrazone in quantities varying from 0.001 to 0.1% and preferably from 0.005 to 0.05% by weight with respect to the chlorinated hydrocarbon, an epoxide such as butylene oxide and/or propylene oxide in quantities varying from 0.01% to 1%, and preferably from 0.1 to 0.3% by weight, and of a phenol selected from the group consisting of thymol, eugenol, isopropyl-p-hydroxyanisole, p-tert-amyl- or butyl-phenol and hydroquinone monomethylether in quantities varying from 0.001% to 0.05%, and preferably from 0.001% to 0.01% by weight.

Other than trichloroethylene and perchloroethylene, various other halogenated hydrocarbons may be protected against decomposition by the stabilizers of this invention, e.g. chloroform, methylchloroform, methylene chloride, carbon tetrachloride, dichloroethylene, trichloroethane, vinylidene chloride, vinyl chloride and the like.

To illustrate further the present invention and the advantages thereof, the following specific examples are given, it being understood that these are merely intended to be illustrative and not limitative.

Examples 1–6

Samples of trichloroethylene, stabilized with the stabilizers and in the quantities recorded in the following table, were evaluated with regard to their stability characteristics on the basis of the accelerated oxidation test, as specified by the U.S.A. Army-Navy—Aeronautical Specification MIL-T7003 and Federal Specification OT-634/a standards.

Such a stability test consisted in reflux-boiling for 48 hrs. and in a 500 ml. flask, 200 ml. of trichloroethylene, admixed with the recorded quantities of stabilizer, by bubbling through a glass pipe of 3 mm. diameter water-saturated oxygen at a speed of 10–12 bubbles/min.; in the vapor phase, a small steel plate, size ½ x 2 x 1/16 inches was suspended, while another small steel plate of ¼ x ¾ x 1/16 inch was suspended in the liquid phase. As a light and heat source, a sanded 150 watt glass bulb was placed under the flask.

At the end of the test, the acidity of the trichloroethylene was determined by measuring the pH of the aqueous extracts, using, in all cases, the same water-trichloroethylene ratio (1:1), the presence of phosgene and the ramification of the small steel plates suspended in vapor phase (the one most exposed to corrosion) was observed.

The results are recorded in the following table, wherein the percentage of the different additives are given by weight with respect to trichloroethylene.

Tests 1 to 3 are given merely for purposes of comparison.

| Example | Stabilizer | Percentage by weight | Initial pH | Initial acidity (HCl percent by weight) | pH after the oxidizing test | Acidity after the oxidizing test (HCl percent by weight) | Phosgene | State of small plate in vapor phase |
|---|---|---|---|---|---|---|---|---|
| 1 | None | | 7 | | 1 | Saturated | Saturated | Very corroded. |
| 2 | Furfuraldimethylhydrazone | 0.025 | 7 | | 8.5 | 0.0001 | Absent | Perfectly bright and absolutely uncorroded. |
| 3 | Butylene oxide | 0.20 | 7 | | 1–2 | Saturated | Saturated | Very corroded. |
|  | Propylene oxide | 0.05 | | | | | | |
|  | Thymol | 0.002 | | | | | | |
| 4 | Furfuraldimethylhydrazone | 0.015 | 7 | | 7 | Neutral | Absent | Perfectly polished and absolutely uncorroded. |
|  | Butylene oxide | 0.20 | | | | | | |
|  | Propylene oxide | 0.05 | | | | | | |
|  | Thymol | 0.002 | | | | | | |
| 5 | Furfuraldimethylhydrazone | 0.015 | 7 | | 7 | do | do | Do. |
|  | Butylene oxide | 0.25 | | | | | | |
|  | p-Tert-amyl phenol | 0.002 | | | | | | |
| 6 | Furfuraldimethylhydrazone | 0.015 | 7 | | 7 | do | do | Do. |
|  | Butylene oxide | 0.20 | | | | | | |
|  | Propylene oxide | 0.05 | | | | | | |
|  | Hydroquinone monomethylether | 0.002 | | | | | | |

As many apparently widely different embodiments of this invention can be made without departing from the spirit and scope thereof, it is to be understood that this invention is not to be limited to the specific embodiments thereof except as defined in the appended claims.

I claim:

1. A stable composition of matter comprising a lower aliphatic liquid halogenated hydrocarbon and a stabilizing amount of a hydrazone of the formula:

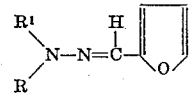

wherein R and $R^1$ are the same or different and represent lower alkyl moieties of from 1 to 3 carbon atoms.

2. The composition of claim 1, wherein the liquid halogenated hydrocarbon is selected from the group consisting of trichloroethylene, perchloroethylene, chloroform, methylchloroform, methylene chloride, carbon tetrachloride, dichloroethylene, trichloroethane, vinylidene chloride, vinyl chloride and mixtures thereof.

3. The composition of claim 1, wherein the liquid halogenated hydrocarbon is selected from the group consisting of trichloroethylene and perchloroethylene, and the hydrazone is present in amounts of from between 0.001% and 0.1% by weight thereof.

4. The composition of claim 3 wherein the liquid halogenated hydrocarbon is trichloroethylene, R and $R^1$ are methyl, and the hydrazone is present in an amount of from between 0.005% and 0.05% by weight trichloroethylene.

5. The composition of claim 3, wherein there is also present a stabilizing amount of an epoxy compound and a stabilizing amount of a phenol.

6. The composition of claim 5, wherein the epoxide is present in an amount of from about between 0.01% and 1.0% and the phenol is present in an amount of from between 0.001% and 0.05% by weight halogenated hydrocarbon.

7. The composition of claim 6, wherein the epoxide is selected from the group consisting of butylene oxide, propylene oxide, glycidol, amylene oxide, chloropropylene oxide and mixtures thereof, and the phenol is selected from the group consisting of thymol, phenol, nitrophenol, eugenol, isopropyl-p-hydroxyanisole, p-tert-amyl-phenol, p-tert-butyl-phenol and hydroquinonemonomethylether.

References Cited
UNITED STATES PATENTS

| | | | |
|---|---|---|---|
| 2,043,259 | 6/1936 | Missbach | 260—652.5 |
| 2,371,646 | 3/1945 | Petering et al. | 260—652.5 |
| 3,000,977 | 9/1961 | Patron et al. | 260—652.5 |

LEON ZITVER, *Primary Examiner.*

M. JACOB, *Assistant Examiner.*